United States Patent
Timms

(10) Patent No.: US 7,428,431 B2
(45) Date of Patent: Sep. 23, 2008

(54) EXTENDABLE ANTENNA AND SPEAKER BOX

(75) Inventor: Don Timms, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 678 days.

(21) Appl. No.: 11/176,501

(22) Filed: Jul. 6, 2005

(65) Prior Publication Data

US 2007/0010302 A1 Jan. 11, 2007

(51) Int. Cl.
*H04M 1/00* (2006.01)

(52) U.S. Cl. .............. 455/575.7; 455/569.1; 455/575.1; 455/575.4; 343/701; 343/702

(58) Field of Classification Search ............... 455/575.7
See application file for complete search history.

(56) References Cited

U.S. PATENT DOCUMENTS

| | | | | |
|---|---|---|---|---|
| 5,513,383 | A * | 4/1996 | Tsao ........................ | 455/575.7 |
| 5,555,449 | A * | 9/1996 | Kim ........................ | 455/575.7 |
| 5,603,100 | A * | 2/1997 | Yasuda ..................... | 455/566 |
| 5,926,748 | A * | 7/1999 | Yoshihara et al. ........ | 455/575.7 |
| 6,052,567 | A | 4/2000 | Ito et al. | |
| 6,101,402 | A | 8/2000 | Bartha et al. | |
| 6,208,874 | B1 * | 3/2001 | Rudisill et al. ........... | 455/575.4 |
| 6,269,259 | B1 * | 7/2001 | Lai ........................... | 455/569.1 |
| 6,304,222 | B1 * | 10/2001 | Smith et al. ................. | 343/702 |
| 6,337,914 | B1 | 1/2002 | Phillipps | |
| 6,377,827 | B1 * | 4/2002 | Rydbeck ................... | 455/575.3 |
| 6,424,820 | B1 * | 7/2002 | Burdick et al. ............ | 455/41.1 |
| 6,825,810 | B2 * | 11/2004 | Ragner et al. ......... | 343/700 MS |
| 7,050,008 | B2 * | 5/2006 | Saito et al. .................. | 343/702 |
| 7,187,959 | B2 * | 3/2007 | Ponce De Leon et al. | 455/575.7 |
| 2006/0055607 | A1 * | 3/2006 | Satoh et al. ................. | 343/702 |
| 2006/0240881 | A1 * | 10/2006 | Cho et al. ................. | 455/575.4 |

FOREIGN PATENT DOCUMENTS

| | | |
|---|---|---|
| DE | 4410995 | 10/1994 |
| EP | 0651545 | 5/1995 |
| EP | 0924793 | 6/1999 |
| WO | WO 02/35810 | 5/2002 |
| WO | WO 02/100127 | 12/2002 |

OTHER PUBLICATIONS

International Search Report (ISR): PCT/ISA/220, 210 for International Application No. PCT/US2006/026191, ISR dated Nov. 22, 2006, 12 pages.

* cited by examiner

*Primary Examiner*—Matthew Anderson
*Assistant Examiner*—Hai V Nguyen

(57) ABSTRACT

A wireless communication device includes a housing, and a retractable combination speaker box and antenna mechanism operably coupled with the housing. The retractable combination speaker box and antenna mechanism includes a speaker box with an enclosed acoustic volume, and an antenna. The retractable combination speaker box and antenna mechanism is movable between at least a retracted position where the retractable combination speaker box and antenna mechanism is adjacent with the housing, the antenna is in a retracted condition, and the speaker box includes a retracted enclosed acoustic volume, and a deployed position where the retractable combination speaker box and antenna mechanism is moved away from the housing, the antenna is in a deployed condition farther away from the housing than the retracted condition, and the speaker box includes a deployed enclosed acoustic volume that is greater than the retracted enclosed acoustic volume.

14 Claims, 4 Drawing Sheets

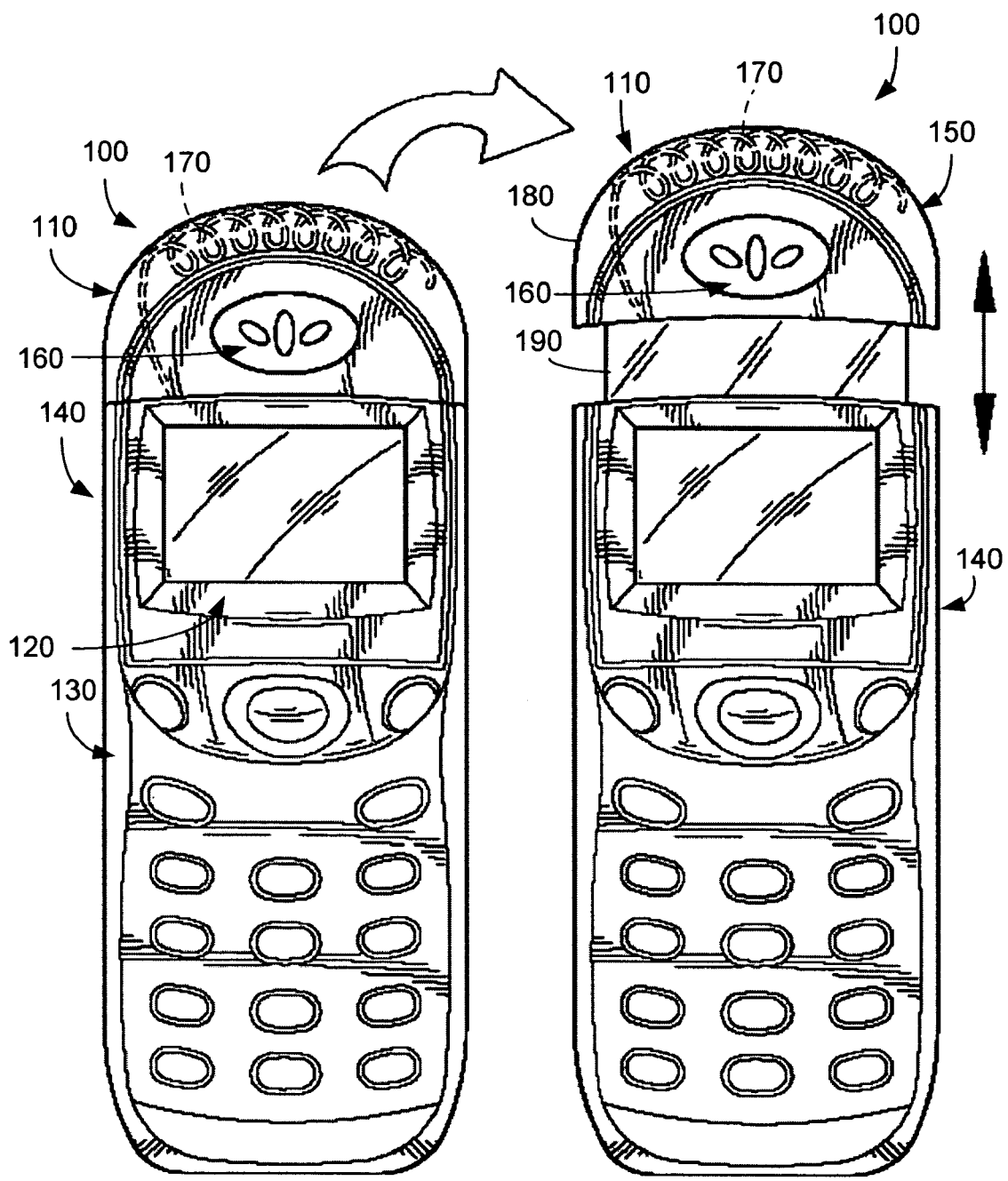
FIG. 1     FIG. 2

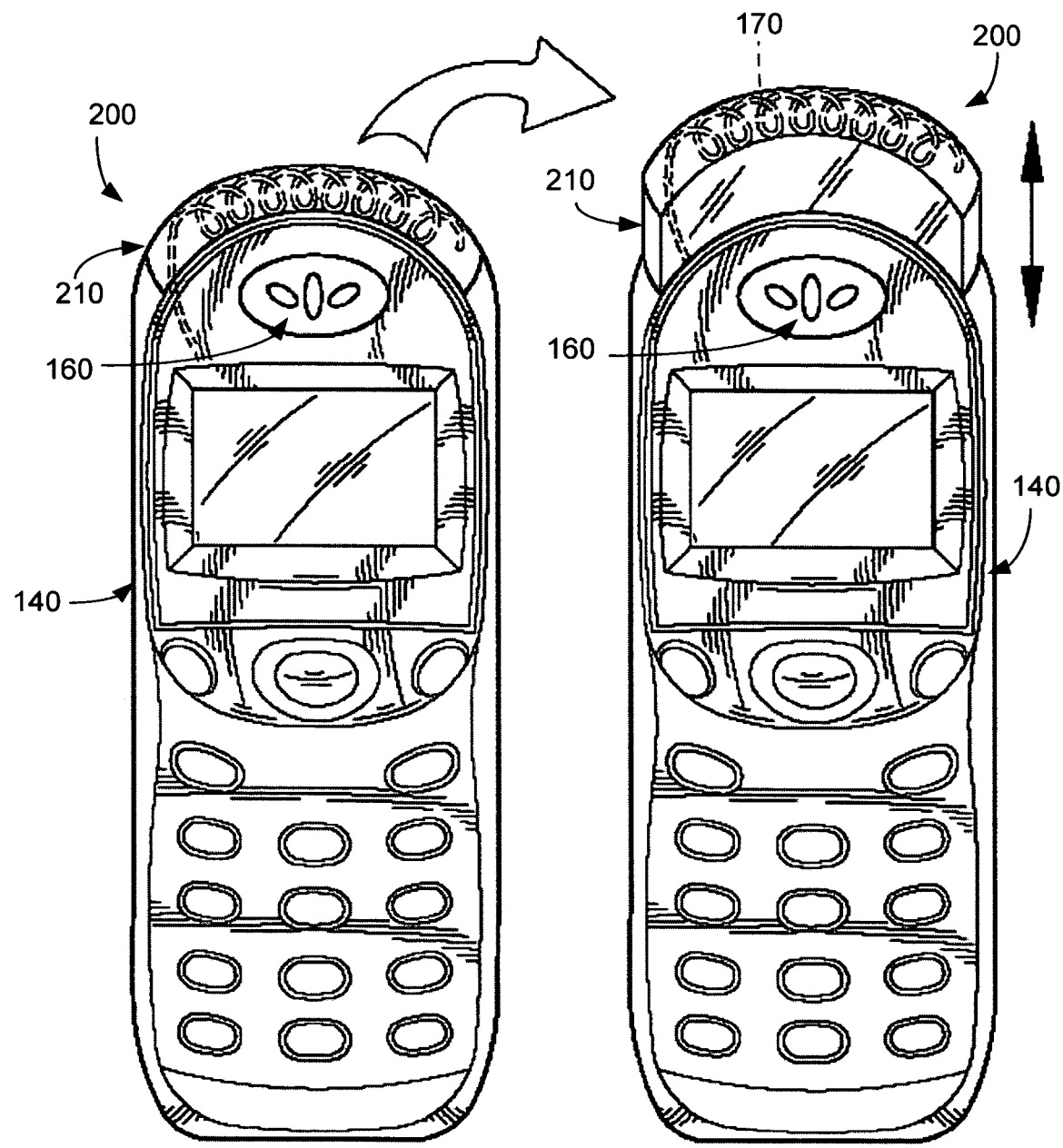
FIG. 3  FIG. 4

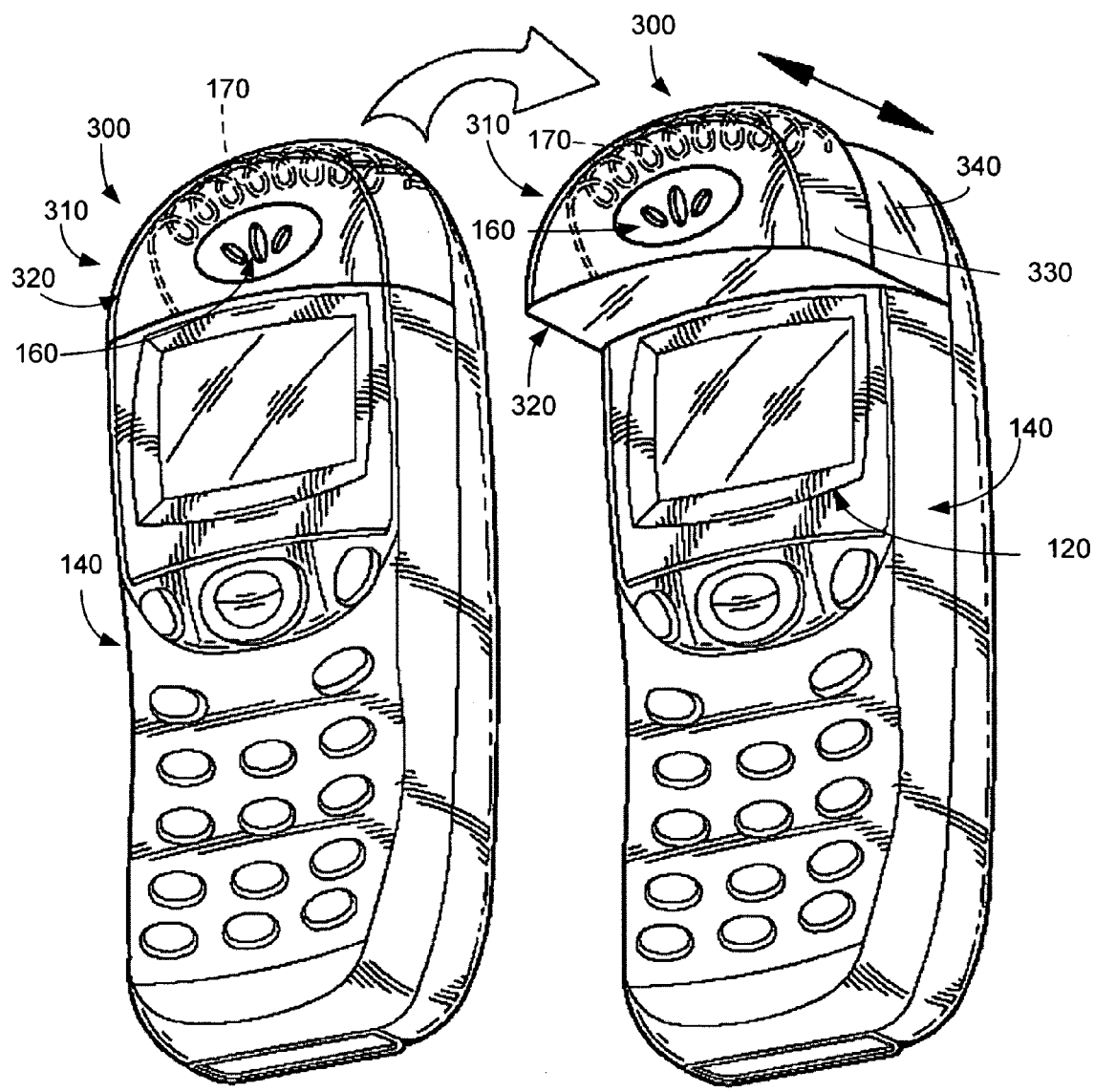
FIG. 5 FIG. 6

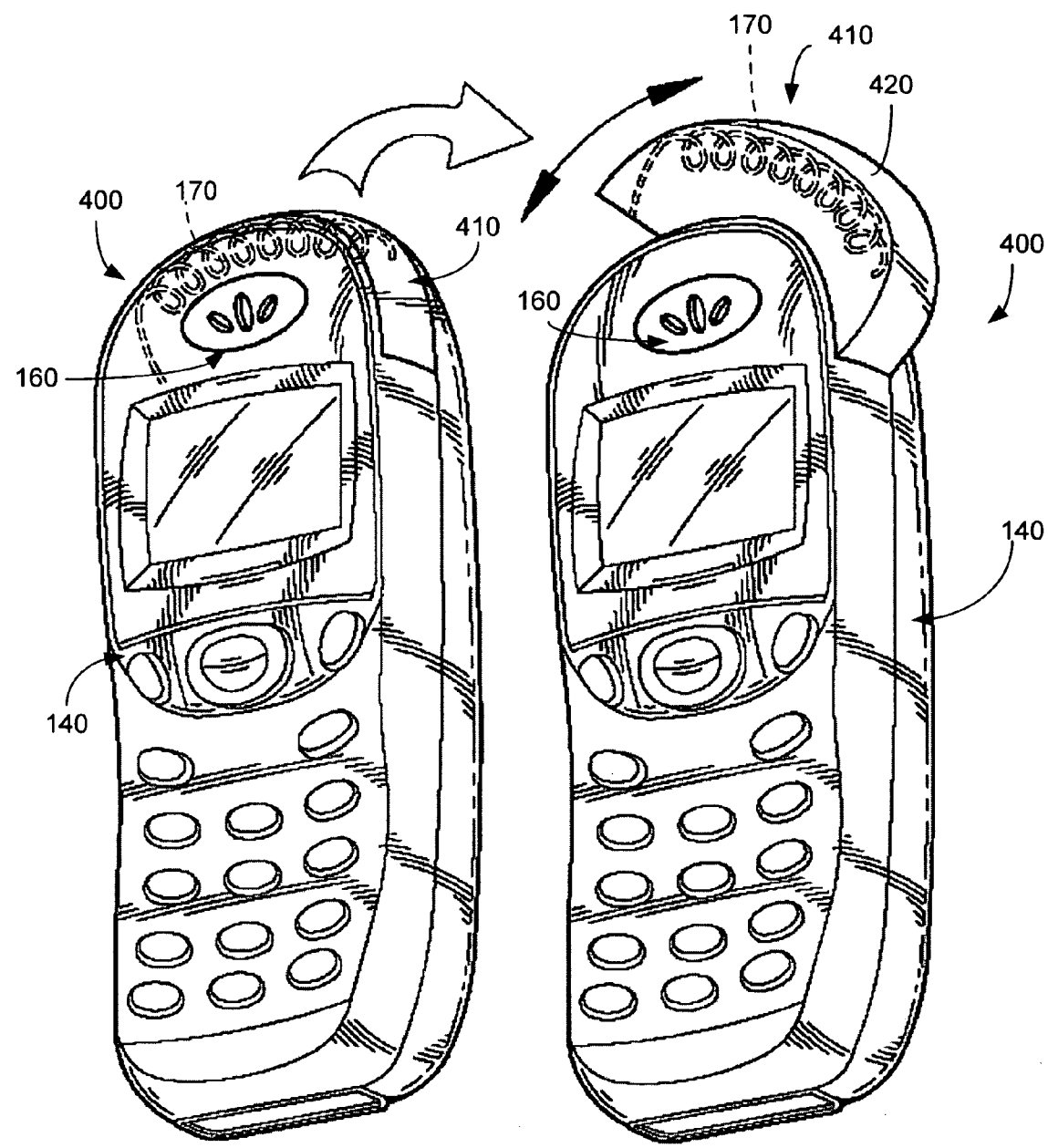
FIG. 7  FIG. 8

EXTENDABLE ANTENNA AND SPEAKER BOX

FIELD OF THE INVENTION

The present invention relates, in general, to wireless communication devices, and, in particular to, sound and antenna systems for wireless communication devices.

BACKGROUND OF THE INVENTION

Wireless communication devices (e.g., cell phones) are becoming smaller, sleeker, and more compact. To make cell phones more compact, newer cell phones are being designed with stationary, non-retractable antennas that are built into the cell phone housing. Building the antenna into the cell phone housing allows the cell phone to have a smaller design. Eliminating a projecting antenna also make the cell phone easier and more comfortable to store in one's pants pocket or purse.

Newer cell phones have speaker phone speakers that allow one to listen to the speaker without having to hold the cell phone up to one's ear. A problem with these speaker phone technologies is that the audible quality of the speaker is not very good, especially for listening to a caller or an audio file (e.g., MP3 file) with the speaker.

SUMMARY

According to one embodiment, a wireless communication device includes a retractable combination speaker box and antenna mechanism. In a retracted position, the combination speaker box and antenna mechanism is flush with the housing of the wireless communication device. In a deployed position, the combination speaker box and antenna mechanism projects from the housing of the wireless communication device. The projecting combination speaker box and antenna mechanism provides better antenna quality and better speaker sound quality that was available in the past.

According to another embodiment, a wireless communication device includes a wireless communication device housing and a retractable combination speaker box and antenna mechanism operably coupled with the housing. The retractable combination speaker box and antenna mechanism includes a speaker box with an enclosed acoustic volume, and an antenna. The retractable combination speaker box and antenna mechanism is movable between at least a retracted position where the retractable combination speaker box and antenna mechanism is adjacent with the housing, the antenna is in a retracted condition, and the speaker box includes a retracted enclosed acoustic volume, and a deployed position where the retractable combination speaker box and antenna mechanism is moved away from the housing, the antenna is in a deployed condition farther away from the housing than the retracted condition, and the speaker box includes a deployed enclosed acoustic volume that is greater than the retracted enclosed acoustic volume.

According to another embodiment, a wireless communication device includes a wireless communication device housing including an exposed outer surface that defines a volume in space, and a retractable combination speaker box and antenna mechanism operably coupled with the housing. The retractable combination speaker box and antenna mechanism includes a speaker box with an enclosed acoustic volume, an antenna, and an exposed outer surface that defines a volume in space. The retractable combination speaker box and antenna mechanism is movable between at least a retracted position where the exposed outer surface of the wireless communication device housing and the retractable combination speaker box and antenna mechanism define a first volume, and a deployed position where the exposed outer surface of the wireless communication device housing and the retractable combination speaker box and antenna mechanism define a second volume greater than the first volume.

BRIEF DESCRIPTION OF THE DRAWINGS

FIG. 1 is a front elevational view of an embodiment of a wireless communication device including a retractable combination speaker box and antenna mechanism.

FIG. 2 is a front elevational view of the wireless communication device illustrated in FIG. 1, and shows the combination speaker box and antenna mechanism in a deployed condition.

FIG. 3 is a front elevational view of another embodiment of a wireless communication device including a retractable combination speaker box and antenna mechanism.

FIG. 4 is a front elevational view of the wireless communication device illustrated in FIG. 3, and shows the combination speaker box and antenna mechanism in a deployed condition.

FIG. 5 is a front elevational view of a further embodiment of a wireless communication device including a retractable combination speaker box and antenna mechanism.

FIG. 6 is a front elevational view of the wireless communication device illustrated in FIG. 5, and shows the combination speaker box and antenna mechanism in a deployed condition.

FIG. 7 is a front elevational view of a still further embodiment of a wireless communication device including a retractable combination speaker box and antenna mechanism.

FIG. 8 is a front elevational view of the wireless communication device illustrated in FIG. 7, and shows the combination speaker box and antenna mechanism in a deployed condition.

DETAILED DESCRIPTION

With reference initially to FIGS. 1-2, an embodiment of a wireless communication device 100 including a retractable combination speaker box and antenna mechanism 110 will now be described. Although in the embodiments shown the wireless communication device is a cellular phone, the wireless communication device may be any wireless device including an antenna and a speaker.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

The embodiment of the wireless communication device 100 shown in FIGS. 1 and 2 includes a display screen 120, control keys 130, and a device housing 140. The retractable combination speaker box and antenna mechanism 110 and the device housing 140 both include an outer surface that together define a volume.

The retractable combination speaker box and antenna mechanism 110 includes a body 150, a speaker 160, and an internal antenna 170. Although a single speaker 150 and a single antenna 170 will be shown and described, the wireless communication device may include more than one speaker 150 and/or antenna 170.

In the embodiment shown, the body 150 includes a rounded upper member 180 and a generally rectangular lower member 190. The generally rectangular lower member 190 is slidably received in an upper part of the device housing 140. The body 150 forms a speaker box and the inside of the body 150 defines an enclosed acoustic volume.

In the embodiment shown, the internal antenna 170 is internal to and on the inner wall of the rounded upper member 180. Although the internal antenna is shown as having a generally helical configuration, the internal antenna 170 may have alternative configurations or constructions. The antenna 170 may also be one or more of located internal to the body 150, within the body 150, and/or external to the body 150. The antenna 170 may be constructed of a coplanar metal, steel, ceramic, or other conducting material and located on one or more internal or external surfaces of the housing 140 and/or body 150. Connections from the housing 140 to the antenna 170 may be by, but not by way of limitation, slide connections, wires, and/or board to speaker connections. In alternative embodiments, the antenna 170 may be a two-piece (or multi-piece) antenna where one piece covers the other and when the combination speaker box and antenna mechanism 110 is deployed, all pieces are exposed, improving antenna performance. Although the antenna 170 is shown and described as being within the deployable mechanism 110, in alternative embodiments, the deployable speaker box and antenna 170 may be separate, and the antenna 170 may be located within the housing 140.

The wireless communication device 100 includes a pop-up or deployment mechanism (not shown) such as, but not limited to, a spring latch or a handle, that causes the combination speaker box and antenna mechanism 110 to be deployed.

The wireless communication device 100 will now be described in use. To improve antenna performance and acoustic performance of the speaker 160, the combination speaker box and antenna mechanism 110 is deployed away from the top of the housing 140 in the longitudinal direction of the housing 140. To deploy the combination speaker box and antenna mechanism 110, a user actuates the deployment mechanism causing the spring latch to release and urge the combination speaker box and antenna mechanism 110 into the position shown in FIG. 2. In this position, the effective length of the wireless communication device 100 is increased and the enclosed acoustic volume of the combination speaker box and antenna mechanism 110 is increased relative to the enclosed acoustic volume of the combination speaker box and antenna mechanism 110 in the retracted position shown in FIG. 2. The inside of the combination speaker box and antenna mechanism 110 is significantly more hollow in the deployed position, providing a larger speaker box and enclosed acoustic volume, then in the retracted position. Also, the total volume defined by the exposed surface of the housing 140 and the body 150 is greater when the combination speaker box and antenna mechanism 110 is deployed (FIG. 2) compared to when the combination speaker box and antenna mechanism 110 is retracted (FIG. 1). The increased enclosed acoustic volume or larger speaker box improves the sound quality of the speaker 160 during speaker play (e.g., when using speaker phone, when playing audio files). Deploying the combination speaker box and antenna mechanism 110 to the position shown in FIG. 2 also extends the antenna 170 relative to the housing 140, improving RF performance.

With reference to FIGS. 3 and 4, another embodiment of a wireless communication device 200 including a retractable combination speaker box and antenna mechanism 210 will be described. Elements in FIGS. 3 and 4 that are similar to those described previously will be shown and/or described with the same reference numbers.

The combination speaker box and antenna mechanism 210 includes a telescoping body 220 and an internal antenna 170. In the embodiment shown, the body 220 has a slightly curved configuration. The body 220 is telescopingly and slidably received in an upper part of the device housing 140. In the retracted position shown in FIG. 3, a top of the combination speaker box and antenna mechanism 210 is flush with a top of the housing 140.

In use, to improve antenna performance and acoustic performance of the speaker 160, the combination speaker box and antenna mechanism 210 is deployed by actuating a deployment mechanism. This causes the combination speaker box and antenna mechanism 210 to telescope and be deployed away from the top of the housing 140 in a longitudinal direction of the housing, out of the top of the wireless communication device 200, into the position shown in FIG. 4. In this position, the enclosed acoustic volume of the combination speaker box and antenna mechanism 210 is increased relative to the enclosed acoustic volume of the combination speaker box and antenna mechanism 210 in the retracted position shown in FIG. 3. The increased enclosed acoustic volume or larger speaker box improves the sound quality of the speaker 160. Deploying the combination speaker box and antenna mechanism 210 out of the top of the wireless communication device 200 to the position shown in FIG. 4 also extends the antenna 170 relative to the housing 140, improving antenna performance.

With reference to FIGS. 5 and 6, another embodiment of a wireless communication device 300 including a retractable combination speaker box and antenna mechanism 310 will be described. Elements in FIGS. 5 and 6 that are similar to those described previously will be shown and/or described with the same reference numbers.

The combination speaker box and antenna mechanism 310 includes a deployable and retractable body 320, a speaker 160, and an internal antenna 170. In the embodiment shown, the body 320 includes a rounded front member 330 and a rounded rear member 340. The rounded rear member 340 is slidably received in an upper part of the device housing 140. The inside of the body 320 defines an enclosed acoustic volume. In the retracted position shown in FIG. 5, a front of the combination speaker box and antenna mechanism 310 is flush with a front of the housing 140.

To improve antenna performance and acoustic performance of the speaker 160, the combination speaker box and antenna mechanism 310 is deployed laterally forward away from the housing 140 to the position shown in FIG. 6 by actuating the deployment mechanism. In this position, the front member 330 overhangs the display 120 and the enclosed acoustic volume of the combination speaker box and antenna mechanism 310 is increased relative to the enclosed acoustic volume of the combination speaker box and antenna mechanism 310 in the retracted position shown in FIG. 5. The increased enclosed acoustic volume improves the sound quality of the speaker 160 and extending the antenna 170 relative to the housing 140 improves antenna performance.

With reference to FIGS. 7 and 8, another embodiment of a wireless communication device 400 including a retractable combination speaker box and antenna mechanism 410 will be described. Elements in FIGS. 7 and 8 that are similar to those described previously will be shown and/or described with the same reference numbers.

The combination speaker box and antenna mechanism 410 includes a rotatable lid member 420 and an internal antenna 170. In the embodiment shown, the lid member 420 has a slightly curved configuration. The lid member 420 is rotatably received in an upper part of the device housing 140. In the retracted position shown in FIG. 7, a top of the lid member 420 of the retractable combination speaker box and antenna mechanism 410 is flush with a top of the housing 140. Although the combination speaker box and antenna mechanism 410 is shown on top of the housing 140, in alternative embodiments, the combination speaker box and antenna mechanism 410 may be located on the front, back, bottom, and/or side of the housing 140.

In use, to improve antenna performance and acoustic performance of the speaker 160, the combination speaker box and antenna mechanism 410 is deployed by actuating a deployment mechanism. This causes the combination speaker box and antenna mechanism 410 to rotate in a clockwise direction, upward and to the right of the top of the wireless communication device 400, away from the top of the housing 140, into the position shown in FIG. 8. In alternative embodiments, the combination speaker box and antenna mechanism 410 may flip, pivot, and/or rotate in a front-to-back direction, in a back-to-front direction, in a left-to-right (clockwise) direction, in a right-to-left (counter-clockwise) direction, in any combination of these directions, or in alternative directions. In the deployed position shown in FIG. 8, the enclosed acoustic volume of the combination speaker box and antenna mechanism 410 is increased relative to the enclosed acoustic volume of the combination speaker box and antenna mechanism 410 in the retracted position shown in FIG. 7. The increased enclosed acoustic volume or larger speaker box improves the sound quality of the speaker 160. Deploying the combination speaker box and antenna mechanism 410 out of the top of the wireless communication device 200 to the position shown in FIG. 8 also extends the antenna 170 relative to the housing 140, improving antenna performance.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art having the benefit of the present disclosure.

What is claimed is:

1. A wireless communication device, comprising:
   a wireless communication device housing including an exposed outer surface;
   a retractable combination speaker box and antenna mechanism operably coupled with the wireless communication device housing, the retractable combination speaker box and antenna mechanism including a speaker box with an enclosed acoustic volume, and an antenna;
   wherein the retractable combination speaker box and antenna mechanism movable between a retracted position and a deployed position;
   wherein, in the retracted position, at least a portion of the sneaker box fits within the housing such that the retractable combination speaker box and antenna mechanism is adjacent with the wireless communication device housing and does not cover any portion of the exposed outer surface of the wireless communication device housing, and the speaker box includes a retracted enclosed acoustic volume; and
   wherein, in the deployed position, the at least a portion of the speaker box of the retractable combination speaker box and antenna mechanism is moved away from the top of the wireless communication device housing in the longitudinal direction of the wireless communication device housing such that the antenna is in a deployed position farther away from the housing than when in the retracted condition, and such that the speaker box includes a deployed enclosed acoustic volume that is greater than the retracted enclosed acoustic volume.

2. The wireless communication device of claim 1, wherein the wireless communication device housing includes a top, the combination speaker box and antenna mechanism includes a speaker, and the combination speaker box and antenna mechanism is deployed away from the top of the wireless communication device housing in a longitudinal direction of the housing.

3. The wireless communication device of claim 1, wherein the wireless communication device housing includes a top, the combination speaker box and antenna mechanism includes a top flush with the top of the wireless communication device housing when in the retracted position, and the combination speaker box and antenna mechanism telecopingly deploys away from the top of the wireless communication device housing in a longitudinal direction of the wireless communication device housing.

4. The wireless communication device of claim 1, wherein the wireless communication device housing includes a front, the combination speaker box and antenna mechanism includes a speaker and a front flush with the front of the wireless communication device housing when in the retracted position, and the combination speaker box and antenna mechanism is deployed laterally forward away from the top of the wireless communication device housing.

5. The wireless communication device of claim 1, wherein the wireless communication device housing includes a top, the combination speaker box and antenna mechanism includes a top flush with the top of the wireless communication device housing when in the retracted position, and the combination speaker box and antenna mechanism rotates away from the top of the wireless communication device housing when deployed with respect to a pivot point.

6. The wireless communication device of claim 1, wherein the retractable combination speaker box and antenna mechanism includes a speaker therein.

7. The wireless communication device of claim 1, wherein the retractable combination speaker box and antenna mechanism includes a body, and the antenna is at least one of located internal to the body, within the body, and external to the body.

8. A wireless communication device, comprising:
   a wireless communication device housing including an exposed outer surface;
   a retractable combination speaker box and antenna mechanism operably coupled with the wireless communication device housing and movable between a retracted position and a deployed position, the retractable combination speaker box and antenna mechanism including a speaker box with an enclosed acoustic volume, and an antenna;
   wherein, in the retracted position at least a portion of the retractable combination sneaker and antenna mechanism fits within the wireless communication device housing such that the exposed outer surface of the wireless communication device housing is not covered by any portion of the retractable combination sneaker box and antenna mechanism; and wherein the exposed outer surface of the wireless communication device housing and the retractable combination speaker box and antenna mechanism in the retracted position define a first speaker volume including the enclosed acoustic volume, and wherein the exposed outer surface of the wireless communication device housing and the retractable combination speaker box and antenna mechanism in the deployed position define a second sneaker volume greater than the first sneaker volume.

9. The wireless communication device of claim 8, wherein the wireless communication device housing includes a top, the combination speaker box and antenna mechanism includes a speaker, and the combination speaker box and antenna mechanism is deployed away from the top of the wireless communication device housing in a longitudinal direction of the wireless communication device housing.

10. The wireless communication device of claim 8, wherein the wireless communication device housing includes a top, the combination speaker box and antenna mechanism includes a top flush with the top of the wireless communication device housing when in the retracted position, and the combination speaker box and antenna mechanism telecopingly deploys away from the top of the wireless communication device housing in a longitudinal direction of the wireless communication device housing.

11. The wireless communication device of claim 8, wherein the wireless communication device housing includes a front, the combination speaker box and antenna mechanism includes a speaker and a front flush with the front of the wireless communication device housing when in the retracted position, and the combination speaker box and antenna mechanism is deployed laterally forward away from the top of the wireless communication device housing.

12. The wireless communication device of claim 8, wherein the wireless communication device housing includes a top, the combination speaker box and antenna, mechanism includes a top flush with the top of the wireless communication device housing when in the retracted position, and the combination speaker box and antenna mechanism rotates away from the top of the wireless communication device housing when deployed with respect to a pivot point.

13. The wireless communication device of claim 8, wherein the retractable combination speaker box and antenna mechanism includes a speaker therein.

14. The wireless communication device of claim 8, wherein the retractable combination speaker box and antenna mechanism includes a body, and the antenna is at least one of located internal to the body, within the body, and external to the body.

* * * * *